(12) United States Patent
Hwang et al.

(10) Patent No.: US 9,774,904 B2
(45) Date of Patent: Sep. 26, 2017

(54) METHOD AND APPARATUS FOR SEARCHING FOR IPTV SERVICE RELAY DEVICES AND METHOD AND APPARATUS FOR INTERACTING WITH DEVICES

(75) Inventors: In-chul Hwang, Suwon-si (KR); Mun-jo Kim, Suwon-si (KR); Eun-hee Rhim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 777 days.

(21) Appl. No.: 12/324,913

(22) Filed: Nov. 28, 2008

(65) Prior Publication Data
US 2009/0144787 A1    Jun. 4, 2009

Related U.S. Application Data

(60) Provisional application No. 60/991,519, filed on Nov. 30, 2007, provisional application No. 60/991,541, (Continued)

(30) Foreign Application Priority Data

Nov. 18, 2008 (KR) .................. 10-2008-0114751

(51) Int. Cl.
*H04N 7/173* (2011.01)
*H04N 21/436* (2011.01)
(Continued)

(52) U.S. Cl.
CPC ... *H04N 21/43615* (2013.01); *H04N 7/17318* (2013.01); *H04N 7/17354* (2013.01); *H04N 21/4331* (2013.01); *H04N 21/4788* (2013.01); *H04N 21/482* (2013.01); *H04N 21/6125* (2013.01); *H04N 21/6175* (2013.01)

(58) Field of Classification Search
CPC ......... H04N 21/43615; H04N 21/4331; H04N 21/4788; H04N 21/482; H04N 21/6125; H04N 21/6175
See application file for complete search history.

(56) References Cited

U.S. PATENT DOCUMENTS 6,185,611 B1    2/2001   Waldo et al.
6,594,693 B1 *  7/2003   Borwankar .................. 709/219
(Continued)

FOREIGN PATENT DOCUMENTS

CN    1620129 A    5/2005
CN    1685323 A    10/2005
(Continued)

OTHER PUBLICATIONS

Open IPTV Forum Standard- Functional Architecture-V1.0 Sep. 20, 2007.*
(Continued)

*Primary Examiner* — Yassin Alata
(74) *Attorney, Agent, or Firm* — Sughrue Mion, PLLC

(57) ABSTRACT

Provided are method and apparatus for searching for a second device relaying at least one IPTV service included in the same residential network as a first device, wherein the searching is performed by the first device, and receiving the IPTV service provided from outside of the residential network through a found second device.

16 Claims, 9 Drawing Sheets

```
M-SEARCH * HTTP/1.1

HOST: 239.255.255.250:1900

MAN: "ssdp:discover"

MX: 30

ST: urn:schemas-oiptvf-org:device:ig:1
```

Related U.S. Application Data filed on Nov. 30, 2007, provisional application No. 61/026,326, filed on Feb. 5, 2008, provisional application No. 61/029,659, filed on Feb. 19, 2008, provisional application No. 61/029,834, filed on Feb. 19, 2008, provisional application No. 61/051,158, filed on May 7, 2008, provisional application No. 61/071,757, filed on May 15, 2008, provisional application No. 61/080,332, filed on Jul. 14, 2008.

(51) Int. Cl.
*H04N 21/433* (2011.01)
*H04N 21/4788* (2011.01)
*H04N 21/482* (2011.01)
*H04N 21/61* (2011.01)

(56) References Cited

U.S. PATENT DOCUMENTS

| | | | |
|---|---|---|---|
| 7,400,725 | B1 | 7/2008 | Yumiba et al. |
| 8,645,487 | B2 | 2/2014 | Sung et al. |
| 2003/0105718 | A1 | 6/2003 | Hurtado et al. |
| 2004/0103428 | A1 | 5/2004 | Seok et al. |
| 2004/0120344 | A1 | 6/2004 | Sato et al. |
| 2004/0255302 | A1 | 12/2004 | Trossen |
| 2006/0085816 | A1 | 4/2006 | Funk et al. |
| 2006/0100147 | A1* | 5/2006 | Thompson et al. ............ 514/12 |
| 2006/0117342 | A1 | 6/2006 | Park et al. |
| 2006/0209857 | A1 | 9/2006 | Hicks, III |
| 2006/0259927 | A1 | 11/2006 | Acharya et al. |
| 2006/0291412 | A1* | 12/2006 | Naqvi et al. ................. 370/328 |
| 2007/0064637 | A1 | 3/2007 | Lee et al. |
| 2007/0079380 | A1 | 4/2007 | Kawaguchi et al. |
| 2007/0121584 | A1 | 5/2007 | Qiu et al. |
| 2007/0143444 | A1 | 6/2007 | Kamiya et al. |
| 2007/0162931 | A1 | 7/2007 | Mickle et al. |
| 2007/0206773 | A1 | 9/2007 | Branam |
| 2007/0240200 | A1 | 10/2007 | Han |
| 2007/0250908 | A1 | 10/2007 | Sim et al. |
| 2008/0066095 | A1 | 3/2008 | Reinoso |
| 2008/0141285 | A1 | 6/2008 | Lee et al. |
| 2008/0212937 | A1 | 9/2008 | Son |
| 2009/0100147 | A1* | 4/2009 | Igarashi ...................... 709/218 |
| 2009/0180484 | A1 | 7/2009 | Igarashi |
| 2009/0183211 | A1 | 7/2009 | Yan et al. |
| 2009/0235317 | A1 | 9/2009 | Igarashi |
| 2009/0307307 | A1 | 12/2009 | Igarashi |

FOREIGN PATENT DOCUMENTS

| | | |
|---|---|---|
| CN | 1798112 A | 7/2006 |
| CN | 1839631 A | 9/2006 |
| CN | 1852411 A | 10/2006 |
| CN | 101060532 A | 10/2007 |
| CN | 101155191 A | 4/2008 |
| EP | 1 182 819 A2 | 2/2002 |
| EP | 1 235 431 A1 | 8/2002 |
| EP | 1 331 785 A1 | 7/2003 |
| EP | 1 638 336 A1 | 3/2006 |
| EP | 1 667 454 A1 | 6/2006 |
| EP | 1 679 896 A1 | 7/2006 |
| EP | 1696668 A1 | 8/2006 |
| EP | 2 000 915 A2 | 12/2008 |
| EP | 2 000 917 A1 | 12/2008 |
| JP | 2002-366835 A | 12/2002 |
| JP | 2007272868 A * | 10/2007 |
| KR | 10-2001-0025456 A | 4/2001 |
| KR | 20010050795 A | 6/2001 |
| KR | 20010080210 A | 8/2001 |
| KR | 10-2006-0025746 A | 3/2006 |
| KR | 10-2006-0025748 A | 3/2006 |
| KR | 10-2006-0066096 A | 6/2006 |
| KR | 10-2006-0103621 A | 10/2006 |
| KR | 10-2006-0120650 A | 11/2006 |
| KR | 10-2007-0032103 A | 3/2007 |
| KR | 10-2007-0053090 A | 5/2007 |
| KR | 10-2007-0061228 A | 6/2007 |
| KR | 10-2007-0061555 A | 6/2007 |
| KR | 10-0754221 B1 | 9/2007 |
| KR | 10-2007-0100069 A | 10/2007 |
| KR | 10-2007-0105164 A | 10/2007 |
| KR | 10-2007-0105628 A | 10/2007 |
| KR | 10-2007-0119351 A | 12/2007 |
| KR | 10-2008-0010862 A | 1/2008 |
| KR | 10-2008-0017662 A | 2/2008 |
| KR | 10-0818300 B1 | 3/2008 |
| KR | 10-0837705 B1 | 6/2008 |
| WO | 0024192 A1 | 4/2000 |
| WO | 01/15423 A1 | 3/2001 |
| WO | 2006/061434 A1 | 6/2006 |
| WO | 2006/122024 A2 | 11/2006 |
| WO | 2007/032652 A1 | 3/2007 |
| WO | 2007/102547 A1 | 9/2007 |
| WO | 2007/102550 A1 | 9/2007 |
| WO | 2007/105460 A1 | 9/2007 |

OTHER PUBLICATIONS

Office Action issued Aug. 26, 2011 by the Mexican Patent Office in counterpart Mexican Patent Application No. MX/a/2010/005624.
Communication dated Mar. 20, 2012 from the State Intellectual Property Office of P.R. China in counterpart Chinese application No. 200980103120.1.
Communication dated Jan. 20, 2012 from the Mexican Institute of Industrial Property in counterpart Mexican application No. MX/a/2010/005624.
Digital Video Broadcasting (DVB) Transport of MPEG-2 Transport Stream (TS) Based DVB Services over IP Based Networks Document DVB A086 Rev.5, Jul. 2007, 126 pages.
Communication, dated Aug. 3, 2012, issued by the Indonesian Patent Office in counterpart Indonesian Applicatio No. W-00201003224.
Communication, dated Jul. 3, 2012, issued by the State Intellectual Property Office of P.R. China in counterpart Chinese Application No. 200980109747.8.
Communication, dated Jun. 8, 2012, issued by the State Intellectual Property Office of P.R. China in counterpart Chinese Application No. 200980111266.0.
Communication, dated Jun. 27, 2012, issued by the State Intellectual Property Office of P.R. China in counterpart Chinese Application No. 200980104286.5.
Communication dated Nov. 5, 2012 issued by the State Intellectual Property Office of the People's Republic of China in counterpart Chinese Application No. 200880117209.9.
Communication dated Feb. 28, 2013 issued by the State Intellectual Property Office of P.R. China in counterpart Chinese Patent Application No. 200980110455.6.
Communication dated Jan. 5, 2013 issued by the State Intellectual Property Office of P.R. China in counterpart Chinese Patent Application No. 200980126539.9.
Communication dated May 3, 2013 from the State Intellectual Property Office of P.R. China in a counterpart application No. 200880117209.9.
Communication, dated Jun. 8, 2013, issued by the State Intellectual Property Office of P.R. China in counterpart Chinese Patent Application No. 200980111266.0.
Communication, dated Jul. 11, 2013, issued by the European Patent Office in counterpart European Patent Application No. 09723898.4.
"Telecommunications and Internet converged Services and Protocols for Advanced Networking (TISPAN); IPTV Architecture; IPTV functions supported by the IMS subsystem," ETSI TS 182 027 V2.0.0, ETSI, Feb. 29, 2008, 7 pages.
"Digital Video Broadcasting (DVB); Transport of MPEG-2 TS Based DVB Services over IP Based Networks," ETSI TS 102 034 V1.3.1, ETSI, European Broadcasting Union, Oct. 31, 2007, pp. 1-128.
"IPTV architecture Dedicated subsystem for IPTV functions in NGN," Draft ETSI DTS 02049 V0.0.9, ETSI, Sep. 2007, pp. 1-37.

(56) References Cited

OTHER PUBLICATIONS

Stallard, Paul, et al., "DVB thoughts on Service Discovery and Selection," The Internet Society, Feb. 10, 2003, pp. 1-11.
"Telecommunications and Internet Converged Services and Protocols for Advanced Networking (TISPAN); IMS based IPTV Stage 3 Specification," ETSI TS 183 063 V0.0.6, ETSI, Nov. 2007, pp. 1-81.
Communication, dated Jan. 15, 2014, issued by the European Patent Office in counterpart European Patent Application No. 08855589.1.
Communication, dated Jan. 28, 2014, issued by the European Patent Office in counterpart European Patent Application No. 09704767.4.
Communication, dated Apr. 3, 2014, issued by the European Patent Office in counterpart European Patent Application No. 09723898.4.
Communication, dated Jan. 29, 2014, issued by the European Patent Office in counterpart European Patent Application No. 09723546.9.
Communication, dated Mar. 3, 2014, issued by the European Patent Office in counterpart European Patent Application No. 09707306.8.
International Search Report (PCT/ISA/210) and Written Opinion (PCT/ISA/237), dated Jun. 22, 2009, issued by the International Searching Authority in counterpart International Patent Application No. PCT/KR2009/000370.
International Search Report (PCT/ISA/210) and Written Opinion (PCT/ISA/237), dated Nov. 5, 2009, issued by the International Searching Authority in counterpart International Patent Application No. PCT/KR2009/001325.
International Search Report (PCT/ISA/210) and Written Opinion (PCT/ISA/237), dated Jul. 10, 2009, issued by the International Searching Authority in counterpart International Patent Application No. PCT/KR2009/000549.
International Search Report (PCT/ISA/210) and Written Opinion (PCT/ISA/237), dated Nov. 11, 2009, issued by the International Searching Authority in counterpart International Patent Application No. PCT/KR2009/001556.
International Search Report (PCT/ISA/210) and Written Opinion (PCT/ISA/237), dated Feb. 23, 2010, issued by the International Searching Authority in counterpart International Patent Application No. PCT/KR2009/004126.
Communication, dated Sep. 29, 2011, issued by the European Patent Office in counterpart European Patent Application No. 09704867.2.
International Search Report (PCT/ISA/210) and Written Opinion (PCT/ISA/237), dated Aug. 18, 2009, issued by the International Searching Authority in counterpart International Patent Application No. PCT/KR2009/000323.
Nishimto, Yusei, et al., "Advanced Conditional Access System for Digital Broadcasting Receivers Using Metadata," IEEE Transactions on Broadcasting, vol. 53, No. 3, Sep. 1, 2007, pp. 697-702.
"Broadcast and On-line Services: Search, select, and rightful use of content on personal storage systems ("TV-Anytime"); Part 2: Phase 1—System description," ETSI TS 102 822-2, V1.4.1, Technical Specification, Nov. 1, 2007. pp. 1-127.
Stallard, P., et al., "DVB thoughts on Service Discovery and Selection," MMUSIC, The Internet Society, Feb. 10, 2003, pp. 1-11.
Communication issued Sep. 17, 2014; in related Korean Patent Application No. 10-2008-0114751.
Communication issued Jul. 2, 2014; in related Chinese Patent Application No. 200980111266.0.
ETSI TS 182 028; V2.0; "Telecommunications and Internet converged Services and Protocols for Advanced Networking (TISPAN)"; IPTV Architecture; Jan. 2008; 38 pages total.
Communication, dated Apr. 16, 2014, issued by the State Intellectual Property Office of P.R. China in counterpart Chinese Patent Application No. 200980109747.8.
Communication, dated Jun. 11, 2014, issued by the European Patent Office in counterpart European Patent Application No. 09711644.6.
Beck, Andre, et al., "IMS and IPTV Service Blending—Lessons and Opportunities," Journal of the Institute of Telecommunications Professionals, Jan. 1, 2007, pp. 1-6, http://www.icin.co.uk/files/programmes/Session8A-2.pdf.
Communication dated Oct. 28, 2014 issued by the Korean Intellectual Property Office in counterpart Korean Application No. 10-2008-0044013.
Communication dated Dec. 16, 2014 issued by the Intellectual Property Office of India in counterpart Indian Application No. 961/MUMNP/2010.
Communication dated Nov. 14, 2014 issued by the State Intellectual Property Office of P.R. China in counterpart Chinese Application No. 200980109747.8.
Communication dated Jan. 21, 2015 issued by the Korean Intellectual Property Office in counterpart Korean Patent Application No. 10-2009-7015542.
Communication dated Feb. 13, 2015 issued by the Korean Intellectual Property Office in counterpart Korean Patent Application No. 10-2009-7015543.
Communication dated Mar. 23, 2015 issued by the Korean Intellectual Property Office in counterpart Korean Patent Application No. 10-2009-7006208.
Communication dated Mar. 23, 2015 issued by the Korean Intellectual Property Office in counterpart Korean Patent Application No. 10-2009-7006209.
IPTV Architecture—Dedicated Subsystem for IPTV Functions in NGN, European Telecommunications Standards Institute(ETSI) TS 182 028 V2.0.0(Jan. 17, 2008); 38 pgs.
Transport of MPEG-2 TS Based DVB Services Over IP Based Networks,European Telecommunications Standards Institute(ETSI) TS 102 034 V1.3.1(Oct. 29, 2007); 128 pgs.
Communication dated Mar. 30, 2016, issued by the European Patent Office in counterpart European Application No. 09704767.4.
Communication dated May 23, 2016, issued by the Korean Intellectual Property Office in counterpart Korean Application No. 10-2008-0044013.
Communication dated Mar. 31, 2016, issued by the State Intellectual Property Office of the People's Republic of China in counterpart Chinese Application No. 200980109747.8.
"UPnP Device Architecture 1.0", UPnP Forum, Jul. 2006, XP 055277372, 80 pages total.
Communication dated Jun. 14, 2016, issued by the European Patent Office in counterpart European Application No. 08855589.1.
Communication dated Dec. 28, 2015, issued by the Korean Intellectual Property Office in counterpart Korean Application No. 10-2009-0045471.
Communication dated Jan. 11, 2016, issued by the Korean Intellectual Property Office in counterpart Korean Application No. 10-2008-0044013.
Communication dated Sep. 17, 2015 issued by Korean Intellectual Property Office in counterpart Korean Patent Application No. 10-2009-7006208.
Communication dated Sep. 23, 2015 issued by Korean Intellectual Property Office in counterpart Korean Patent Application No. 10-2009-7006209.
Communication dated Oct. 28, 2015 issued by the State Intellectual Property Office in counterpart Chinese Patent Application No. 200980109747.8.
Communication dated Apr. 30, 2015, issued by the Korean Intellectual Property Office in counterpart Korean Application No. KR 10-2008-0044013.
Communication dated May 18, 2015, issued by the Korean Intellectual Property Office in counterpart Korean Application No. KR 10-2009-0045471.
"Open IPTV Forum—Functional Architecture—V 1.0 Open IPTV Forum Confidential Copyright 2007 Members of the Open IPTV Forum", Sep. 20, 2007, Total 103 pages, XP 55094424, URL: http://www.oipf.tv/docs/OIPF-T1-R1-Functional Architecture-V1 0-2007-09-20.pdf.
Communication dated May 20, 2015, issued by the European Patent Office in counterpart European Application No. 09800581.2.
Communication dated Jul. 2, 2015, issued by the European Patent Office in counterpart European Application No. EP 08855589.1.
Communication dated Mar. 15, 2017, issued by the European Patent Office in counterpart European Application No. 08855589.1.

(56) References Cited

OTHER PUBLICATIONS

Communication dated Jul. 10, 2017, issued by the European Patent Office in counterpart European Patent Application No. 17171160.9.

* cited by examiner

M-SEARCH * HTTP/1.1

HOST: 239.255.255.250:1900

MAN: "ssdp:discover"

MX: 30

ST: urn:schemas-oiptvf-org:device:ig:1

FIG. 4

HTTP/1.1 200 OK

CACHE-CONTROL: max-age = 30

DATE: 28 Nov 2007 21:15:18 GMT

EXT:

LOCATION: http://IGURL/description.xml

SERVER: OS/version UPnP/1.0 product/version

ST: urn:schemas-oiptvf-org:device:ig:1

USN: uuid:3748594-3948576-23457-8913::

FIG. 5

<device xmlns:oiptvfig="urn:schemas-oiptvf-org:igdesc">

<deviceType> urn:schemas-oiptvf-org:device:ig:1 </deviceType>

.........

</device>

FIG. 6

```
<device xmlns:oiptvfig="urn:schemas-oiptvf-org:igdesc">
    <deviceType> urn:schemas-oiptvf-org:device:ig:1 </deviceType>
    .........
    <oiptvfig:igDiscovery>
        <oiptvfig:DefaultURL> baseURL </oiptvfig:DefaultURL>
        <oiptvfig:SPDisoceryURL> discoveryURL</oiptvfig:SPDiscoveryURL>
    </oiptvfig:igDiscovery>
    .........
</device>
```

FIG. 7

```
<root xmlns="urn:schemas-upnp-org:device-1-0">
    <specVersion>
        ...
    </specVersion>
    <URLBase> base URL </URLBase>
    <device>
            <deviceType> urn:schemas-oiptvf-org:device:ig:1 </deviceType>
            ..................
</device>
</root>
```

FIG. 8A

| HTTP Header | POST /igSPDiscoveryURL HTTP/1.1<br>Host: igAddress<br>Content-Type: text/xml; charset=utf-8<br>Content-Length: xxx |
|---|---|

[Blank Line]

| HTTP Body | `<?xml version="1.0" encoding="UTF-8"?>`<br>`<SIP>`<br>`<Header>`<br>   `<Method>` Subscribe `</Method>`<br>`<From>` sip:father@example.com `</From>`₩<br>   `<To/>`<br>   `<ContentLength>` ….`</ContentLength>`<br>   `<Event>` ua-profile `</Event>`<br>   `<Expires>` 3600 `</Expires>`<br>   `<ApplicationType>` application/oiptvf-spdlist `</ApplicationType>`<br>`</Header>`<br>`<Body/>`<br>`</SIP>` |
|---|---|

FIG. 8B

| HTTP Header | POST /igSPDiscoveryURL HTTP/1.1<br>Host: igAddress<br>Content-Type: multipart/related; boundary=--aaabbb<br>Content-Length: xxx |
|---|---|

[Blank Line]

| HTTP Body | --aaabbb<br>Content-Type:text/xml<br>Content-ID: Headers<br><?xml version="1.0" encoding="UTF-8"?><br><SIP><br><Header><br>   <Method> Subscribe </Method><br><From> sip:father@example.com </From>₩<br>   <To/><br>   <ContentLength> ….</ContentLength><br>   <Event> ua-profile </Event><br>   <Expires> 3600 </Expires><br>   <ApplicationType> application/oiptvf-spdlist </ApplicationType><br></Header><br><Body href=cid:realbody /><br></SIP><br>--aaabbb<br>Content-Type:plain/text<br>Content-ID: realbody<br>Content-Length=0<br>--aaabbb |
|---|---|

FIG. 9

```
<?xml version="1.0"?>
<soap:Envelope xmlns:soap="http://www.w3.org/2001/12/soap-envelope"
soap:encodingStyle="http://www.w3.org/2001/12/soap-encoding">
<soap:Body xmlns="urn:oif:req:2007" xmlns:dvb="urn:dvb:ipi:sdns:2006"
xmlns:xsi="http://www.w3.org/2001/XMLSchema-instance">
   <SIP>
<Header>
   <Method> Subscribe </Method>
<From> sip:father@example.com </From>₩
   <To/>
   <ContentLength> ….</ContentLength>
   <Event> ua-profile </Event>
   <Expires> 3600 </Expires>
   <ApplicationType> application/oiptvf-spdlist </ApplicationType>
</Header>
<Body/>
```

FIG. 10

| | |
|---|---|
| HTTP Header | HTTP/1.1 200 OK<br>Content-Type: text/xml; charset=utf-8<br>Content-Length: xxx |

[Blank Line]

| | |
|---|---|
| HTTP Body | `<?xml version="1.0" encoding="UTF-8"?>`<br>`<SIP>`<br>  `<Header>`<br>`<From> sip:father@example.com </From>`<br>`<Call-ID> adfdkljf </Call-ID>`<br>`</Header>`<br>`<Body>`<br>   `<dvb:SericeDiscovery>`….`</dvb:ServiceDiscovery>`<br>`</Body>` |

METHOD AND APPARATUS FOR SEARCHING FOR IPTV SERVICE RELAY DEVICES AND METHOD AND APPARATUS FOR INTERACTING WITH DEVICES

CROSS-REFERENCE TO RELATED PATENT APPLICATION

This application claims the benefit of Korean Patent Application No. 10-2008-0114751, filed on Nov. 18, 2008, in the Korean Intellectual Property Office, and U.S. Provisional Patent Application No. 60/991,541, filed on Nov. 30, 2007, U.S. Provisional Patent Application No. 61/026,326, filed on Feb. 5, 2008, U.S. Provisional Patent Application No. 61/071,757, filed on May 15, 2008, U.S. Provisional Patent Application No. 61/080,332, filed on Jul. 14, 2008, U.S. Provisional Patent Application No. 60/991,519, filed on Nov. 30, 2007, U.S. Provisional Patent Application No. 61/051,158, filed on May 7, 2008, U.S. Provisional Patent Application No. 61/029,834, filed on Feb. 19, 2008, and U.S. Provisional Patent Application No. 61/029,659, filed on Feb. 19, 2008 in the U.S. Patent and Trademark Office, and the disclosure of which is incorporated herein in its entirety by reference.

BACKGROUND OF THE INVENTION

1. Field of the Invention

The present invention relates to a method and apparatus for searching for and interacting with devices in a residential network.

2. Description of the Related Art

Internet Protocol Television (IPTV) provides services such as information services, moving image contents, and broadcasting to TVs through an IP network, that is, a high speed internet network. Since a communication and broadcasting combined service has become more robust and thereby, an interest on the IPTV services has increased, it is expected that activation of the IPTV services may significantly affect communication, broadcasting, contents, and appliance industries.

In general, an IPTV service user may have separate set-top boxes for each IPTV vendor, in order to receive the IPTV services through an IP network. Only the IPTV service user, who has the IPTV set-top boxes manufactured based on standards set by an IPTV service provider providing the IPTV services, may receive the IPTV services provided from the corresponding IPTV service provider. For example, when it is assumed that there exists three IPTV service providers, A, B, and C, a service user, who has purchased a set-top box manufactured by A, can only use IPTV services provided by A. The user may separately purchase a set-top box manufacture by B or C, in order to use IPTV services provided by B or C. Such a problem in compatibility between the IPTV services and the set-top boxes narrows the range of selection for service users. Consequently, quality of the IPTV services may be low or the base of the services may be difficult to expand.

In order to solve such a compatibility problem, an open IPTV forum has been recently established and standardization of IPTV services is under discussion. In this forum, a common standard, which is not dependent upon the IPTV service providers, is to be set and providing of the IPTV services to the service users based on the common standard is being discussed.

The open IPTV forum aims at creating an interface and a hardware platform, which are not dependent upon the IPTV service providers, and providing the IPTV services from a plurality of the IPTV service providers to the user. According to open IPTV forum architecture, even if the users have only set-top boxes from only a select number of IPTV service providers, IPTV services can be provided from each of a plurality of different IPTV service providers and thus, the range of selection of the users may be expanded.

In order for the users to use the services provided from each of a plurality of different IPTV service providers, devices relaying the services provided from a plurality of the IPTV service providers are to exist in a residential network according to functional architecture of the open IPTV forum. Entities such as Application Gateway (AG), IMS Gateway (IG), and CSP Gateway (CG) according to the functional architecture of the open IPTV forum correspond to the relay devices. Such relay devices receive the IPTV services provided from a provider network, existing the outside of the residential network, and relay the received services to terminals in the residential network.

SUMMARY OF THE INVENTION

The present invention provides method and apparatus for searching for Internet Protocol Television (IPTV) service relay devices in which IPTV terminals of a residential network are included in the same residential network, and method and apparatus for interacting between the IPTV service relay devices.

The present invention also provides a computer readable recording medium having embodied thereon a computer program for executing the methods above.

According to an aspect of the present invention, there is provided a method of searching for a second device included in the same residential network as a first device, wherein the searching is performed by the first device, the method including: transmitting a request for searching for a device relaying at least one IPTV service from the outside of the residential network; receiving address information of device description the second device from the second device, in response to the transmitted message; transmitting a request for the device description of the second device to the second device, based on the received address information; and receiving the device description from the second device.

The second device may allow the first device to access the IPTV service provided from outside of the residential network through an IP Multimedia Subsystem (IMS) core network.

The second device may be an IMS Gateway (IG) device based on functional architecture of an open IPTV forum.

The transmitting of a request for searching for the device may include multicasting a request for searching for the IG device to the residential network.

In the multicasting, a message requesting search for the IG device generated using a hypertext transport protocol (HTTP) M-SEARCH method may be multicasted to the residential network.

The device description may include Uniform Resource Identifier (URI) information of the IG device needed for interaction between the first device and the IG device.

The method may further include: transmitting a message requesting a predetermined IPTV service to the IG device based on the URI information of the IG device; and receiving the predetermined IPTV service from the IG device, in response to the message requesting the IPTV service.

The message for requesting the predetermined IPTV service may be generated by using a HTTP POST method.

According to another aspect of the present invention, there is provided an apparatus for searching for a second device included in the same residential network as a first device, wherein the searching is performed by the first device, the apparatus including: a search message transmitter transmitting a request for searching for the device relaying at least one IPTV service from outside of the residential network; a response message receiver receiving address information of device description the second device from the second device, in response to the transmitted message; and a description receiver transmitting a request for the device description of the second device to the second device, based on the address information, and receiving the device description from the second device.

According to another aspect of the present invention, there is provided a computer readable recording medium having embodied thereon a computer program for executing the method of searching the device above.

BRIEF DESCRIPTION OF THE DRAWINGS

The above and other features and advantages of the present invention will become more apparent by describing in detail exemplary embodiments thereof with reference to the attached drawings in which:

FIG. 4 shows a response message according to an embodiment of the present invention;

FIG. 5 shows a device description according to an embodiment of the present invention;

FIG. 6 shows a device description according to another embodiment of the present invention;

FIG. 7 shows a device description according to another embodiment of the present invention;

FIGS. 8A through 8B show IPTV service request messages according to an embodiment of the present invention;

FIG. 9 shows an IPTV service request message according to another embodiment of the present invention;

FIG. 10 shows an IPTV service response message according to an embodiment of the present invention;

DETAILED DESCRIPTION OF THE INVENTION

Hereinafter, the present invention will be described more fully with reference to the accompanying drawings, in which exemplary embodiments of the invention are shown.

Figure 1:
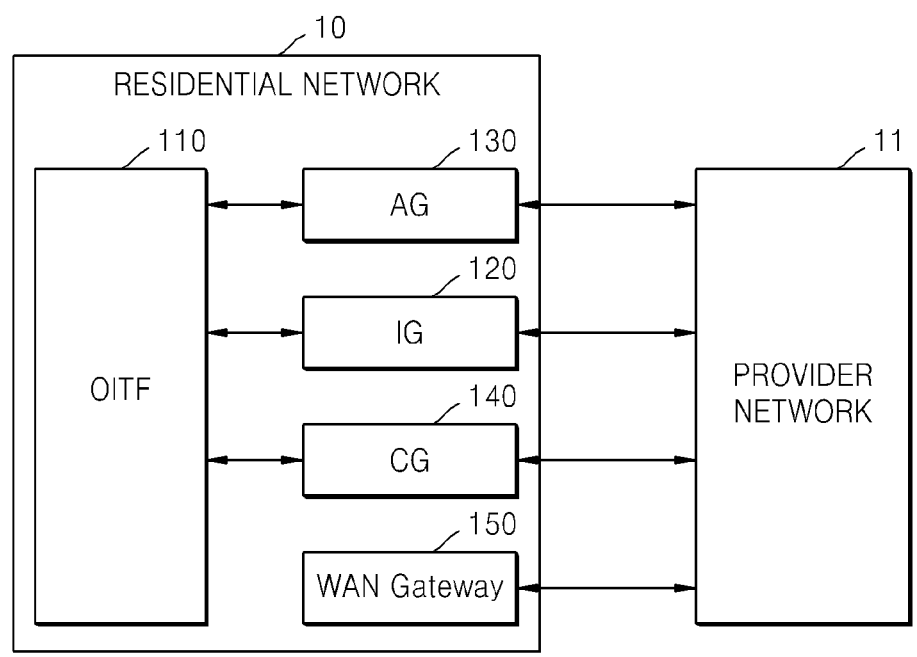
FIG. 1 is a block diagram of residential network architecture in an Internet Protocol Television (IPTV) system according to an embodiment of the present invention.

FIG. 1 is a block diagram of architecture of a residential network 10 in an Internet Protocol Television (IPTV) system according to an embodiment of the present invention.

Referring to FIG. 1, the residential network 10 in the IPTV system according to the exemplary embodiment of the present invention may include an Open IPTV Terminal Functional (OITF) device 110, an IMS Gateway (IG) device 120, an Application Gateway (AG) device 130, a Content and Service Protection (CSP) Gateway (CG) device 140, and a WAN gateway device 150. In FIG. 1, the devices 110 through 150 can be separately included in the residential network 10. However, the devices 110 through 150 may be implemented as hardware/software module type that can be included in one device.

IPTV services are provided from a provider network 11 to the residential network 10. The IG device 120, the AG device 130, the CG device 140, and WAN gateway device 150 receive the IPTV services and relay them to the OITF device 110.

The OITF device 110 uses the IPTV services provided from a plurality of IPTV service providers by selecting one of a plurality of IPTV service providers through interaction with a user and uses the IPTV services provided from the selected IPTV service provider. The OITF device 110 can comprise a display device such as a TV.

The IG device 120 may allow an access to the IPTV services connected with an IP Multimedia Subsystem (IMS) of the OITF device 110. The IG device 120 receives the IPTV services provided from a provider network 11 and relays the received IPTV services to the OITF device 110. The IG device 120 interacts with the OITF device 110 using a predetermined protocol defined for interaction within the residential network 10. In response to a request for providing the IPTV services by the OITF device 110, the IG device 120 requests the IPTV services from the provider network 11 and receives the IPTV services, thereby relaying the received IPTV services to the OITF device 110.

The AG device 130 receives an application and relays the received application to the OITF device 110. When a predetermined application is needed to use the IPTV services, the AG device 130 may receive the application from the provider network 11 and provide the received application to the OITF device 110. The AG device 130 can be an optional device needed only when the OITF device 110 needs to receive and use the application.

The CG device 140 can be also an optional device needed only when IPTV contents and service protection of the outside network are converted into a protection device (for example, Digital Transmission Contents Protection over Internet Protocol (DTCP-IP)) so as to be understandable for the OITF device 110.

The WAN gateway device 150 is provided for supporting actual connection between the residential network 10 and the provider network 11.

As illustrated in FIG. 1, the IPTV services provided from the provider network 11 are provided to the OITF device 110 through predetermined gateway devices 120 through 150. Accordingly, the OITF device 110 can search for the gateway devices 120 through 150 included in the residential network 10 and be provided with the IPTV services through discovered gateway devices.

The exemplary embodiment of the present invention as shown in FIG. 1 may disclose that all the gateways are interconnected one another to provide a service. However, in accordance with another exemplary embodiment, AG device (13) or CG device (140) can be an optional device, and even IG device (120) can be an auxiliary device, i.e., a conditionally mandatory device only when needed. Configuration and method of detecting gateway devices within the residential network according to an exemplary embodiment of the present invention can be implemented in a variety of manners without departing from the scope of the present invention.

Hereinafter, a method of searching for the gateway devices 120 and 150 performed by the OITF device 110, and method and apparatus for interacting with the gateway devices 120 and 150 are described in more detail.

Figures 2, 3:
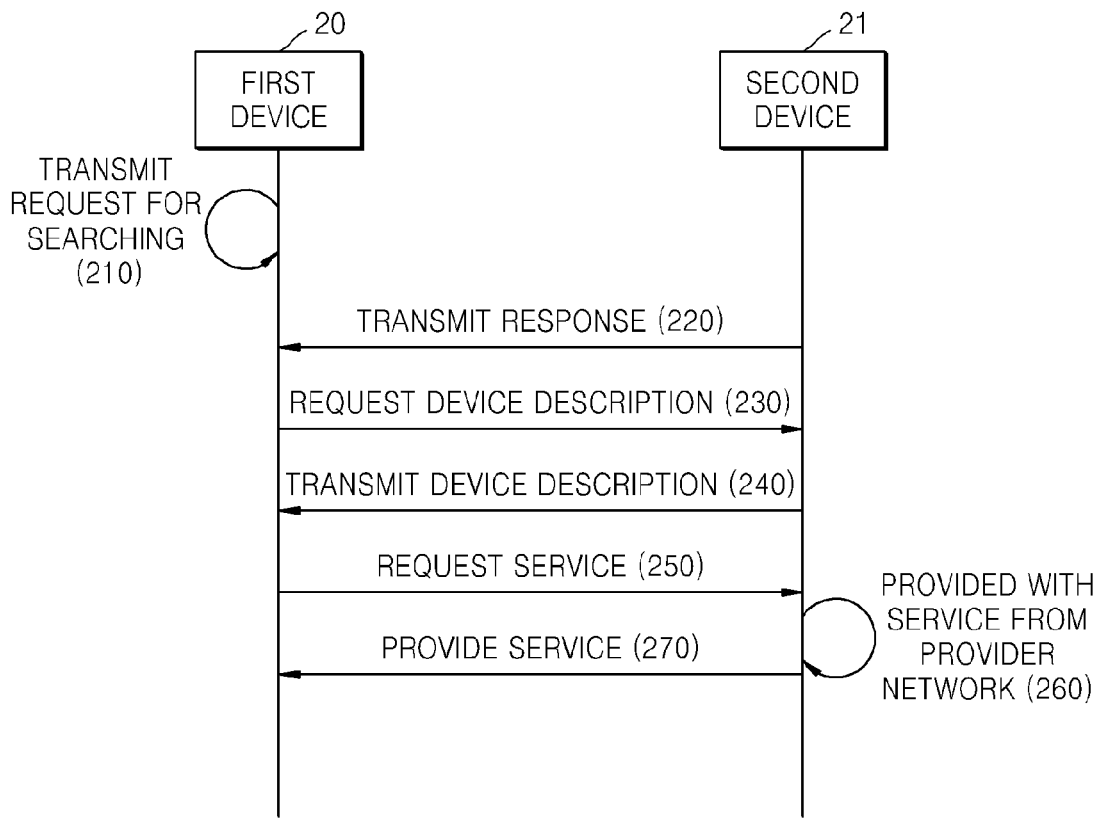
FIG. 2 is a flowchart illustrating a method of searching for devices according to an embodiment of the present invention.
FIG. 3 shows a search request message according to an embodiment of the present invention.

FIG. 2 is a flowchart illustrating the method of searching for devices according to an exemplary embodiment of the present invention.

In FIG. 2, a first device 20 searches for a second device 21 included in the same residential network. The first device 20 may be the OITF device 110 described with reference to FIG. 1. The second device 20 may be any one of the gateway devices 120 through 150, for example in accordance with the exemplary embodiment, the IG device 120. Since the AG device 130 or CG device 140 can be optional device, the first device 20 can search either device only when the AG device 130 or CG device 140 are present within the residential network 10 in accordance with an embodiment of the present invention.

In operation 210, the first device 20 transmits a request for searching for devices, which relay at least one IPTV service provided from outside of the residential network 10. Then, the request for searching for the gateway device 120, 130, or 140, which relays the IPTV service, is transmitted.

The request for searching may be transmitted by multicasting the request to all devices included in the residential network. The multicasted search request message may be generated by using a hypertext transport protocol (HTTP) method. The search request message is described in more detail with reference to FIG. 3.

FIG. 3 shows a search request message according to an exemplary embodiment of the present invention.

Referring to FIG. 3, the search request message transmitted by the first device 20 in operation 210 is generated by using an M-SEARCH method of HTTP.

The parameter "HOST" indicates that the M-SEARCH message is multicasted by an IP/PORT address of "239.255.255.250: 1900" for example. The parameter "MAN" indicates that the M-SEARCH message is a message for searching for devices. The parameter "MX" sets the maximum delay time of a response message. The parameter "ST" indicates that the device found by the M-SEARCH message is the IG device 120 according to the functional architecture of an open IPTV forum.

Referring back to FIG. 2, in operation 220, the second device 21 transmits device description address information of the second device 21 to the first device 20 in response to the request for searching in operation 210. Then, a Uniform Resource Identifier (URI) of the device description can be transmitted to the first device 20. The address information of the device description may be included in a response message. The response message is now described with reference to FIG. 4.

FIG. 4 shows the response message according to an exemplary embodiment of the present invention.

In FIG. 4, the response message transmitted by the second device 21 in operation is illustrated as a response to the M-SEARCH in operation 210. The response message may be HTTP 200 OK.

The parameter "max-age" indicates available time for the response message. The parameter "DATE" indicates the time when the response message is prepared. The parameter "LOCATION" indicates the URI of the device description. The parameter "ST" indicates that the second device 21 is the IG device 120 according to the functional architecture of the open IPTV forum and the parameter "USN" indicates a Universally Unique Identifier (UUID) of the second device 21.

Referring back to FIG. 2, in operation 230, the first device 20 requests the device description from the second device 21 based on the address information of the device description of the second device 21 received in operation 220. The device description is requested according to the URI information of the parameter "LOCATION" included in the response message illustrated in FIG. 4.

In operation 240, the second device 21 transmits its device description to the first device 20, in response to the request of the device description in operation 230.

The device description includes Uniform Resource Locator (URL) information of the IPTV services required to interact between the first device 20 and the second device 21. The device description is now described in more detail with reference to FIGS. 5-7.

FIG. 5 shows the device description according to an exemplary embodiment of the present invention. The device description may be written in an eXtensible Markup Language (XML) form.

Referring to FIG. 5, the device description according to an exemplary embodiment of the present invention includes a tag indicating that the second device 21 is the IG device 120 according to the functional architecture of the open IPTV forum. A schema "urn:schemas-oiptvf-org:device:ig:1" of the "device type" tag can be used to indicate that the second device 21 is the IG device 120.

FIG. 6 shows a device description according to another embodiment of the present invention. The device description illustrated in FIG. 6 further includes a tag for indicating an URL address of an IPTV service.

In order for the first device 20 to interact with the second device 21 and so as to be provided with a predetermined IPTV service, the URL address of the second device 21 should be known to the first device 20. Accordingly, the device description includes information about the URL of the second device 21 which is different according to the IPTV service or types of interaction. The first device 20, which receives the device description, refers to the device description, accesses the second device 21 with the different URL to receive the service.

For example, in order for the first device 20 to request a service for searching for information about a plurality of IPTV service providers in the provider network, that is, an "SPDiscovery" service, the URL address for requesting the service may be known to the first device 20. Accordingly, the device description includes the basic URL address of the second device 21 and a URL address related to searching for services of the IPTV service providers.

The URL address related to searching for services of the IPTV service providers can be included in the "SPDiscoveryURL" tag.

When the basic URL address is "DefaultURL", the URL related to the searching for services of the IPTV service provider may be presumed by a service name and the interaction method from DefaultURL, as in "DefaultURL/SPDiscovery".

Even thoughonly the searching for services of the IPTV service providers is illustrated in FIG. 6, URL information about all services or interaction methods, which may be relayed by the second device 21 and provided to the first device 20, may be included in the device description.

FIG. 7 shows a device description according to another embodiment of the present invention. In the device description illustrated in FIG. 7, Universal Plug and Play (UPnP) device description is expanded and information about the second device 21 is included in the UPnP device description.

FIG. 7 shows that the second device 21 can be the IG device 120. The "deviceType" tag under the "device" tag-may include information indicating that the second device 21 is the IG device 120.

Unlike FIG. 5, URL information of the service is omitted from the device description, except for the basic URL. When the URL of another service can be assumed from the basic URL, the URL information of the service may be omitted from the device description. As described above, when the basic URL is "DefaultURL" and the URL of the "SPDiscovery" service is "DefaultURL/SPDiscovery", the URL of the "SPDiscovery" may be easily assumed from "DefaultURL". In this case, the URL of the service may be omitted from the device description.

Referring back to FIG. 2, the first device 20 requests a predetermined IPTV service from the second device 21, in operation 250. Here, the first device 20 requests to relay a predetermined IPTV service provided from the provider network in the outside of the residential network. A message for requesting the IPTV service is transmitted to the second device 21. The message for requesting the IPTV service may be generated by using a HTTP POST method. An example where the IPTV service is a service for searching for the IPTV service providers of the provider network is illustrated.

FIGS. 8A through 8B show IPTV service request messages according to an embodiment of the present invention.

As illustrated in FIGS. 8A and 8B, the IPTV service request messages can be generated according to HTTP, which is a protocol defined for interaction between the devices in the residential network. The IPTV service request message according to an exemplary embodiment of the present invention is generated by using a POST method of HTTP.

Referring to FIG. 8A, URL information and/or basic URL information of the IPTV service are included in a HTTP POST message header of the IPTV service request message. As described above, the basic URL information may be URL information of the second device 21, that is, the IG device 120.

In accordance with an exemplary embodiment of the present invention, the URL of the service for searching for the IPTV service providers "/igSPDiscoveryURL" can be included in the HTTP POST message header. The parameter "Host" indicates the URL information of the second device 21, that is, the IG device 120. "Content-Type" indicates a form of a document included in a HTTP body and "Content-Length" indicates a length of a document included in the HTTP body.

A HTTP POST message body includes the message transmitted to the provider network by the second device 21. In FIG. 8A, the message transmitted to the provider network by the second device 21 for requesting the service for searching for the IPTV service providers is generated by using a "Subscribe" method of a Session Initiation Protocol (SIP).

Referring to FIG. 8B, the IPTV service request message generated by using the POST method of HTTP may be prepared in a form of Multi-Purpose Internet Mail Extensions (MIME).

In the HTTP header, "Content-Type" is set to "multipart/related" and "boundary" is set to "--aaabbb", in order to indicate that the HTTP body is prepared in a MIME form.

The HTTP body includes a plurality of parts divided by "--aaabbb", which is a "boundary." In the part where "Content-ID" is a header, contents of the SIP Subscribe message transmitted by the second device 21 to the provider network are included. In the part where "Content-ID" is "realbody", body contents of the SIP Subscribe message are included. Since the SIP Subscribe message transmitted by the second device 21 to the provider network does not include body contents, there is no part where the "Content-ID" is "realbody", in FIG. 8B.

FIGS. 8A and 8B are only examples. Similarly, the HTTP POST message may include content for forming a service request SIP message in the IG device.

FIG. 9 illustrates the IPTV service request message according to another embodiment of the present invention. As illustrated in FIG. 9, the IPTV service request message may be generated according to SOAP.

Referring to FIG. 9, a SOAP message according to the current embodiment may include the SIP Subscirbe message described with reference to FIGS. 8A and 8B in the "soap:Body" tag.

Referring back to FIG. 2, the second device 21, which receives the message requesting the predetermined IPTV service from the first device 20, in operation 250, receives the IPTV service from the provider network, in operation 260. According to the IPTV service request message received from the first device 20, the second device 21 requests a predetermined IPTV service to the provider network and in response to the request, receives the IPTV service.

In operation 270, the second device 21 relays the IPTV service received in operation 260 and provides the IPTV service to the first device 20. The IPTV services provided from the second device 21 to the first device 20 may include not only searching services such as IPTV service provider searching and IPTV service searching but also multimedia services such as linear TV, video on demand (VOD), and audio on demand (AOD). In addition, person-to-person communication services such as chatting, messaging, and presence service may be included in the IPTV services.

Similarly to the request for the IPTV service in operation 250, providing of the IPTV service in operation 270 is also performed according to a protocol defined for interaction between the devices included in the residential network and is described with reference to FIG. 10.

FIG. 10 illustrates an IPTV service response message according to an embodiment of the present invention.

Referring to FIG. 10, the IPTV service response message according to an exemplary embodiment of the present invention may be generated according to HTTP. The second device 21 generates an HTTP 200 OK message and provides the generated message to the first device 20.

In the HTTP 200 OK message body, a SIP message received from the provider network by the second device 21 is included. The SIP message body includes the IPTV service requested by the first device 20. In FIG. 10, information about IPTV service searching is included in the SIP message body. When the service requested by the first device 20 is the IPTV service searching, information about at least one service, which may be provided from a predetermined IPTV service provider, is included in a "dvb:ServiceDiscovery" tag.

Figure 11:
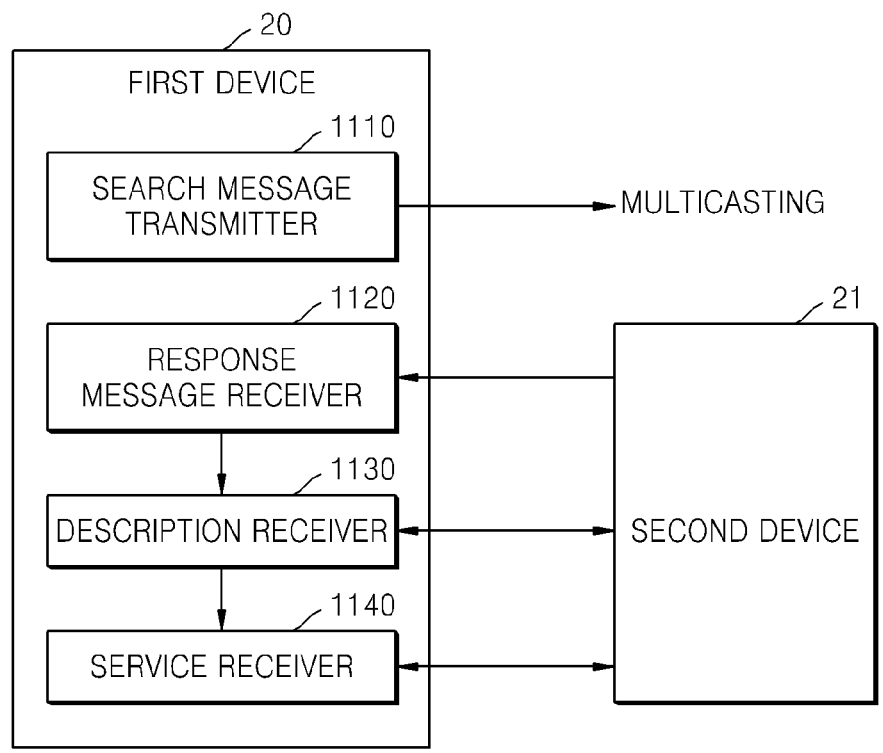
FIG. 11 is a block diagram of a first device according to an embodiment of the present invention.

FIG. 11 is a block diagram of first device 20 according to an embodiment of the present invention.

Referring to FIG. 11, the first device 20 may include a search message transmitter 1110, a response message receiver 1120, a description receiver 1130, and a service receiver 1140.

The search message transmitter 1110 transmits a request for searching for a device relaying at least one IPTV service. The search request may be multicasted to devices included in a residential network. The search request may be executed by multicasting a message prepared by using the HTTP M-SEARCH method, as illustrated in FIG. 3.

The response message receiver 1120 receives a response to the search request from the second device 21. The response message receiver 1120 receives a predetermined response message from the second device 21, which receives the multicasted search request. In response to the HTTP M-SEARCH message, the HTTP 200 OK message described with reference to FIG. 4 is received. The received message includes URL information of the device description of the second device 21.

The description receiver 1130 requests and receives the device description of the second device 21 according to URL information if the device description of the second device included in the response message is received in the response message receiver 1120. The received device description is described with reference to the embodiments of FIGS. 5-7.

The service receiver 1140 requests a predetermined IPTV service to the second device 21 according to the received device description, and receives the predetermined IPTV service. The message requesting the IPTV service is described with reference to FIGS. 8A, 8B, and 9. In addition, the response message transmitted by the second device 21 in response to the message requesting the IPTV service is described with reference to FIG. 10.

Figure 12:
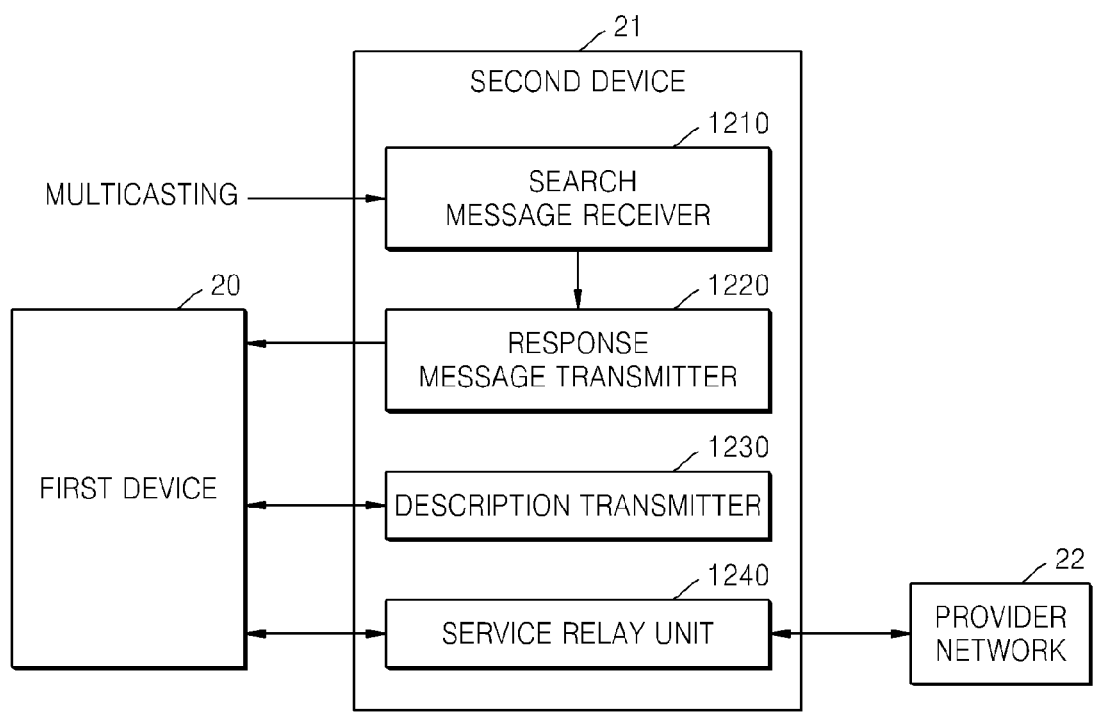
FIG. 12 is a block diagram of a second device according to an embodiment of the present invention.

FIG. 12 is a block diagram of the second device 21 according to an embodiment of the present invention.

Referring to FIG. 12, the second device 21 may include a search message receiver 1210, a response message transmitter 1220, a description transmitter 1230, and a service relay unit 1240.

The search message receiver 1210 receives a request for searching for an IPTV service relay device from the first device 20. The search request can be transmitted to the second device via the multicast in accordance with the exemplary embodiment. The HTTP M-SEARCH message multicasted by the first device 20 to the residential network can be received. The received search request message is described with reference to FIG. 3.

In response to the search request message received in the search message receiver 1210, the response message transmitter 1220 transmits a message including URL information of the device description to the first device 20. Here, the URL information of the device description is added to the HTTP 200 OK message, described with reference to FIG. 4, and is transmitted.

The description transceiver 1230 receives the request message of the device description transmitted by the first device 20 based on the response message transmitted from the response message transmitter 1220 and in response to this, transmits the device description. The transmitted device description is described with reference to the embodiments of FIGS. 5-7.

The service relay unit 1240 receives the IPTV service request transmitted by the first device 20 according to the device description transmitted from the description transmitter 1230. The message requesting the IPTV service is described with reference to FIGS. 8A, 8B, and 9. The service relay unit 1240, which receives the request for providing service, requests a predetermined IPTV service to the provider network 22 according to the IPTV service request message transmitted by the first device 20. When the provider network 22 provides a predetermined IPTV service, a response message including the IPTV service is transmitted to the first device 20. The response message is described with reference to FIG. 10.

Configuration and method of for searching for Internet Protocol Television (IPTV) service relay devices in which IPTV terminals of a residential network are included in the same residential network, and method and apparatus for interacting between the IPTV service relay devices according to an exemplary embodiment of the present invention can be implemented in a variety of manners and comprise other units without departing from the scope of the present invention. For example, an apparatus for searching for IPTV service relay devices and for interacting between the IPTV service relay devices according to an exemplary embodiment of the present invention can comprise a bus coupling each unit of the apparatus as shown in FIGS. 11 and 12, at least one processor coupled to the bus, a memory coupled to the bus to store instructions, received message or generated message, and to the at least one processor to execute instructions as described earlier.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. Carrier waves (e.g., transmission through the Internet) containing at least one of the embodiments of the present invention may be temporarily or permanently stored in the computer readable recording medium. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer implemented searching method for a residential network comprising a first device and one or more gateway devices, wherein the searching is performed by the first device, the method comprising:
    transmitting a request for searching for a gateway device with a parameter which indicates the gateway device to be searched for to a specific multicast address, wherein the gateway device included in the residential network relays at least one IPTV service provided from outside of the residential network to the first device, wherein the request includes an ST parameter which indicates that the gateway device searched for by the request is an IMS Gateway (IG) device;
    receiving, from the gateway device, address information of a device description of the gateway device in response to the transmitted request;
    transmitting a request for the device description of the gateway device to the gateway device, based on the received address information of the device description;
    receiving the device description from the gateway device, wherein the received device description includes Uniform Resource Identifier (URI) information of the IG device and Uniform Resource Identifier (URI) information of the at least one IPTV service provided from outside of the residential network and relayed by the gateway device;

transmitting a message requesting a predetermined IPTV service to the IG device based on the URI information of the IG device, wherein the message comprises the URI information of the at least one IPTV service; and receiving the predetermined IPTV service from the IG device in response to the message requesting the IPTV service.

2. The method of claim 1, wherein the gateway device allows the first device to access the at least one IPTV service provided from the outside of the residential network through an IP Multimedia Subsystem (IMS) core network.

3. The method of claim 2, wherein the IG device is based on functional architecture of an open IPTV forum.

4. The method of claim 3, wherein the transmitting of a request for searching for the gateway device comprises multicasting a message requesting search for the IG device to the residential network, the message being generated using a hypertext transport protocol (HTTP) M-SEARCH method.

5. The method of claim 3, wherein the message for requesting the predetermined IPTV service is generated by using a HTTP POST method.

6. The method of claim 1, wherein the message for requesting the predetermined IPTV service is generated by using a Subscribe method of a Session Initiation Protocol (SIP).

7. The method of claim 1, wherein the message for requesting the predetermined IPTV service is generated in a form of Multi-Purpose Internet Mail Extension (MIME).

8. The method of claim 7, wherein the message for requesting the predetermined IPTV service includes a head having a content type information indicating that a body of the message is prepared in the form of MIME.

9. An apparatus for a residential network comprising a first device and one or more gateway devices, the apparatus comprising:

a search message transmitter transmitting a request for searching for a gateway device with a parameter which indicates the gateway device to be searched for to a specific multicast address, wherein the gateway device included in the residential network relays at least one IPTV service provided from outside of the residential network to the first device, wherein the request includes an ST parameter which indicates that the gateway device searched for by the request is an IMS Gateway (IG) device;

a response message receiver receiving address information of a device description of the gateway device, in response to the transmitted request;

a description transceiver transmitting a request for the device description of the gateway device to the gateway device, based on the received address information of the device description, and receiving the device description from the gateway device, wherein the received device description includes Uniform Resource Identifier (URI) information of the IG device and Uniform Resource Identifier (URI) information of the at least one IPTV service provided from outside of the residential network and relayed by the gateway device; and a service transceiver transmitting a message for requesting a predetermined IPTV service to the IG device based on the URI information of the IG device, and receiving the predetermined IPTV service from the IG device, in response to the message for requesting the IPTV service.

10. The apparatus of claim 9, wherein the gateway device allows the first device to access the at least one IPTV service provided from outside of the residential network through an IP Multimedia Subsystem (IMS) core network.

11. The apparatus of claim 10, wherein the IG device is based on functional architecture of an open IPTV forum.

12. The apparatus of claim 11, wherein the search message transmitter multicasts a message requesting search for the IG device generated using a hypertext transport protocol (HTTP) M-SEARCH method to the residential network.

13. The apparatus of claim 11, wherein the message for requesting the predetermined IPTV service is generated by using a HTTP POST method.

14. The apparatus of claim 11, wherein the message for requesting the predetermined IPTV service is generated by using a Subscribe method of a Session Initiation Protocol (SIP).

15. The apparatus of claim 11, wherein the message for requesting the predetermined IPTV service is generated in a form of Multi-Purpose Internet Mail Extension (MIME).

16. A non-transitory computer readable recording medium having embodied thereon a computer program for executing the method of claim 1.

\* \* \* \* \*